UNITED STATES PATENT OFFICE.

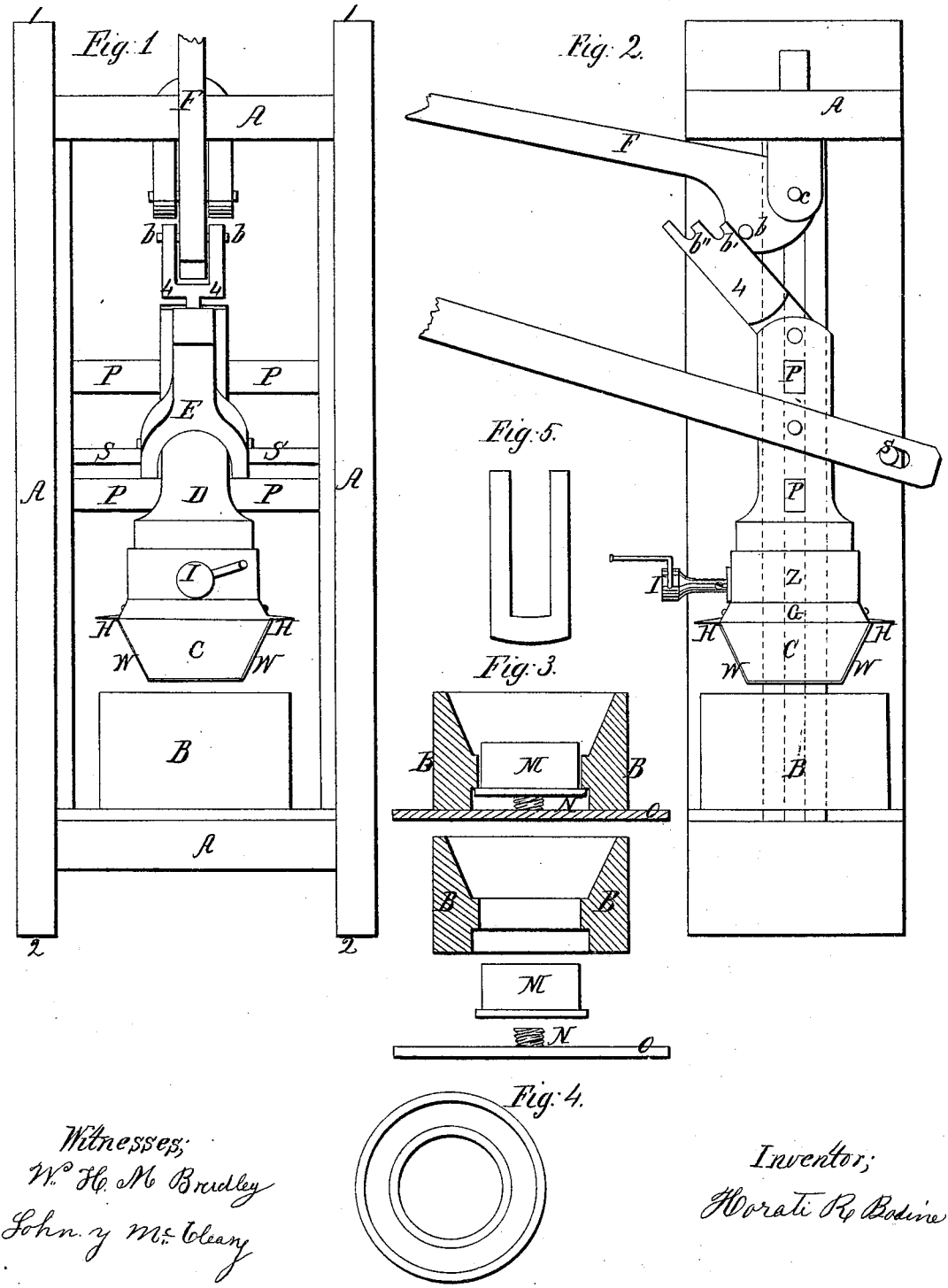

HORATIO R. BODINE, OF FALLS TOWNSHIP, MUSKINGUM COUNTY, OHIO.

IMPROVED MACHINE FOR MAKING POTTERY-WARE.

Specification forming part of Letters Patent No. 52,261, dated January 30, 1866.

*To all whom it may concern:*

Be it known that I, HORATIO R. BODINE, of Fall's township, in the county of Muskingum and State of Ohio, have invented an Improved and useful Pottery-Ware Machine, for making by hand-power jugs, jars, fruit-cans, and pans; and I do hereby declare that the following is a full, clear, and exact description of the construction and operation of the same, reference being had to the annexed drawings, making a part of the specification, in which—

Figure 1 is a front view, and Fig. 2 a side view with one side of the frame off; Fig. 3, an intersectional view of the mold; Fig. 4, a ground view of the mold.

A is the frame or outside part by which the works of the machine are kept in their places; B, a mold in which the clay is pressed into form; C, the plunger, which is forced down into the clay and shapes the inside of the vessel; D, the handle of the plunger; E, the lever by which the required motion is given to the plunger; F, the lever by which the toggle-joint power is applied to the plunger to force it into the clay. M is a movable bottom that projects up in the mold B to displace the clay from under the plunger to favor the power in pressing; N, a spring of wire-coil under the center of the movable bottom to raise it up; U, Fig. 5, a stay shoved under the movable bottom to hold it firmly up while removing the clay; O, a bottom fast to the mold, to keep the stay and spring in place; W, a wire for loosening the vessel from the plunger; H, cutters for loosening the top of the vessel from the waste clay; G, a flat ring or collar to which the ends of wire W is fastened, and also the cutters H; L, a hand-ring that holds the flat ring down to its place; I, a pinion that turns the flat ring G around, which moves the wire and cutters around the plunger.

Operation: When the machine is all ready to operate it will stand upon the end 2 with the top 1 up and fastened. The lever F will have its end placed upon a post, for the purpose of holding it up. The lever E will also have its end placed upon a catch on the same post to hold it up, in order to keep up the plunger C. The mold B is in its place under the plunger. A ball of clay is oiled on the bottom and placed in the mold on the movable bottom projecting up, with the stay U under it. Then by lever E the plunger is brought down with the bottom resting on the clay. Then the arm 4 is placed with its shoulder $b'$ under the fulcrum-bolt $b$, which forms a toggle-joint. Then lever F is brought down, and the plunger is forced down, touching the movable bottom, save the thickness of the bottom of the vessel to be pressed. Lever F is again raised and the stay U removed from under the movable bottom, and the shoulder $b''$ on the end of the arm 4 is placed under the fulcrum $b$ of lever F, and lever F is again brought down, and the plunger is forced down its full distance, and the clay is pressed into form. Lever F is replaced upon the top of the post, as before. The plunger is raised out of the mold and held up by lever E, as before. The vessel adheres to the plunger, and is loosened after the plunger is raised up clear from the mold. When the vessel is loosened the pinion I is turned by a crank, and the ring G is turned around, which moves the wire W and cutters H around the plunger and loosens the vessel. It is then removed.

The nature of the improvements in the aforesaid machine consists in pressing clay into form. The resistance increases as the plunger enters the clay in the mold. Consequently the power must increase, and at the last point the power must be immense. The toggle-joint power, increasing correspondingly, is adapted to this purpose.

The toggle-joint consists of the arm 4 and that part of the lever F from the pivot-bolt $c$ to the fulcrum-bolt $b$, where the shoulder of the arm 4 is placed.

*Movable bottom.*—As the plunger enters the clay in the mold the clay becomes confined under the bottom of the plunger by the clay at the sides, and the clay, being so confined under the plunger, resists the plunger's going down; but by the bottom projecting up in the mold the clay is displaced from between it and the plunger (as the plunger is brought down) before the clay is so much confined at the sides. Then, by removing the stay under the bottom, and the bottom being at liberty then to pass down to its place, there is no resistance under the plunger.

By using the toggle-joint power and removing the clay from under the plunger, in combination, I gain these important points, viz: I can press into form, first, clay of a stiff temper, so that the vessels will bear handling without drying; second, vessels as large as two-gallon sizes; third, with a light power, so as to operate by hand.

*The mode of removing the vessel from the mold and plunger.*—By using no oil to keep the plunger loose in the vessel, as is usual in other modes, the vessel adheres to the plunger, so that it can be pulled out of the mold and held up, so that a holder can be placed under the vessel. Then, by moving the wire and cutters around the plunger, the vessel is loosed, and being on the holder, as soon as loosened from the plunger it can be removed without impairing the shape or causing a strain. Therefore those two difficulties—viz., impairing the shape and straining the piece—which occur in the other modes are avoided in this.

I claim as my invention, and wish to secure by Letters Patent, in the machine aforesaid:

1. The mode of pressing clay into the form of vessels, which mode consists in the application of the toggle-joint power and the removing of the clay from under the plunger by a movable bottom projecting up in the mold.

2. The mode of freeing the piece from the plunger by moving a wire and cutters around the plunger.

HORATIO R. BODINE.

Witnesses:
W. H. M. BRADLEY,
JOHN Y. McCLEARY.